United States Patent
Tian et al.

(10) Patent No.: US 10,260,591 B2
(45) Date of Patent: Apr. 16, 2019

(54) GIMBAL VIBRATION DAMPER FOR UAVS

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 0 days.

(21) Appl. No.: 15/854,776

(22) Filed: Dec. 27, 2017

(65) Prior Publication Data
US 2018/0135723 A1    May 17, 2018

(30) Foreign Application Priority Data
Dec. 30, 2016    (CN) ............... 2016 2 1479389 U

(51) Int. Cl.
| | |
|---|---|
| G03B 15/00 | (2006.01) |
| F16F 13/10 | (2006.01) |
| B64D 47/08 | (2006.01) |
| F16M 11/20 | (2006.01) |
| F16M 13/02 | (2006.01) |
| H04N 5/33 | (2006.01) |
| G03B 17/56 | (2006.01) |
| H04N 5/247 | (2006.01) |
| F16F 9/04 | (2006.01) |
| H04N 5/225 | (2006.01) |
| H04N 5/232 | (2006.01) |
| B64C 39/02 | (2006.01) |
| G02B 27/64 | (2006.01) |
| G01C 11/02 | (2006.01) |

(52) U.S. Cl.
CPC ........... *F16F 13/10* (2013.01); *B64D 47/08* (2013.01); *F16F 9/0418* (2013.01); *F16M 11/2014* (2013.01); *F16M 13/02* (2013.01); *G03B 15/006* (2013.01); *G03B 17/561* (2013.01); *H04N 5/2252* (2013.01); *H04N 5/247* (2013.01); *H04N 5/33* (2013.01); *B64C 39/024* (2013.01); *B64C 2201/127* (2013.01); *G01C 11/02* (2013.01); *G02B 27/64* (2013.01); *G03B 15/00* (2013.01); *H04N 5/2328* (2013.01)

(58) Field of Classification Search
CPC ................................ G03B 15/00
USPC ................................ 396/13
See application file for complete search history.

(56) References Cited

U.S. PATENT DOCUMENTS

| | | | |
|---|---|---|---|
| 6,549,376 B1 * | 4/2003 | Scura ............. | G11B 5/4826 360/245.1 |
| 2014/0037278 A1 * | 2/2014 | Wang ............. | F16M 11/10 396/55 |

(Continued)

*Primary Examiner* — Clayton E Laballe
*Assistant Examiner* — Kevin Butler

(57) ABSTRACT

A gimbal vibration damper for a UAV (unmanned aerial vehicle) includes an upper vibration damping sheet which is connected with a bottom surface of a fuselage of the UAV, a lower vibration damping sheet which is connected with a top of a gimbal, and a vibration damping component which is located between the upper vibration damping sheet and the lower vibration damping sheet, wherein an upper end of the vibration damping component is fixed with the upper vibration damping sheet, a lower end of the vibration damping component is fixed with the lower vibration damping sheet. The gimbal vibration damper provided by the present invention is able to achieve better gimbal damping effect.

19 Claims, 3 Drawing Sheets

(56) References Cited

U.S. PATENT DOCUMENTS

| | | | |
|---|---|---|---|
| 2016/0291445 A1* | 10/2016 | Fisher, Sr. | G03B 15/006 |
| 2017/0183074 A1* | 6/2017 | Hutson | B64C 1/061 |
| 2017/0198747 A1* | 7/2017 | Chen | B64C 39/024 |
| 2018/0054572 A1* | 2/2018 | Minato | B64C 39/024 |
| 2018/0128338 A1* | 5/2018 | Tian | F16F 7/12 |
| 2018/0129212 A1* | 5/2018 | Lee | B64C 39/024 |
| 2018/0131871 A1* | 5/2018 | Wang | G03B 7/08 |
| 2018/0135723 A1* | 5/2018 | Tian | F16F 13/10 |

\* cited by examiner

GIMBAL VIBRATION DAMPER FOR UAVS

CROSS REFERENCE OF RELATED APPLICATION

The present invention claims priority under 35 U.S.C. 119(a-d) to CN 201621479389.3, filed Dec. 30, 2016.

BACKGROUND OF THE PRESENT INVENTION

Field of Invention

The present invention relates to the field of UAV (unmanned aerial vehicle), and more particularly to a gimbal vibration damper for a UAV.

Description of Related Arts

With the technological development of UAVs, UAV applications are increasingly widespread, and the requirements for UAV performances are also getting higher and higher. For example, in the gimbal vibration damping field, the current damping is mainly achieved by the shock-absorbing ball, but the effect is still unable to well meet the needs of users, which limits the further popularization of the use of the UAVs.

Therefore, there is still a need in the field for a gimbal vibration damper which is capable of providing a better damping effect for a gimbal.

SUMMARY OF THE PRESENT INVENTION

An object of the present invention is to provide a gimbal vibration damper for a UAV (unmanned aerial vehicle), which is capable of providing a better damping effect for a gimbal, so as to further broaden the UAV applications.

In the first aspect of the present invention, a gimbal vibration damper for a UAV (unmanned aerial vehicle) is provided, which comprises: an upper vibration damping sheet which is configured to be connected with a bottom surface of a fuselage of the UAV, a lower vibration damping sheet which is configured to be connected with a top of a gimbal, and a vibration damping component which is located between the upper vibration damping sheet and the lower vibration damping sheet, wherein an upper end of the vibration damping component is fixed with the upper vibration damping sheet, a lower end of the vibration damping component is fixed with the lower vibration damping sheet.

Preferably, an upper cross-sectional area of the vibration damping component is smaller than a lower cross-sectional area thereof.

Preferably, all of the upper vibration damping sheet, the lower vibration damping sheet and the vibration damping component are coaxially arranged.

Preferably, a connecting member, which is connected with the vibration damping component, is located at a lower surface of the upper vibration damping sheet.

Preferably, the connecting member is a protruding component, a cross section of the connecting member is round, a joint of the connecting member and the upper vibration damping sheet has a round groove.

Preferably, the protruding component is integrated with the upper vibration damping sheet into one whole.

Preferably, the upper end of the vibration damping component is inserted into the groove.

Preferably, a fitting connector is located at the lower end of the vibration damping component and is fixedly connected with an upper surface of the lower vibration damping sheet.

Preferably, a contact area between the fitting connector and the lower vibration damping sheet is ½ of an upper surface area of the lower vibration damping sheet.

Preferably, the fitting connector does not contact with the upper surface of the lower vibration damping sheet, an air column is provided between the upper vibration damping sheet and the lower vibration damping sheet inside the vibration damping component.

Preferably, a detachable structure is located on an upper surface of the upper vibration damping sheet for detachably connected with the fuselage of the UAV.

Preferably, the detachable structure comprises two sliding tracks, two cross sections of the sliding tracks are respectively "]"-shaped and "["-shaped.

Preferably, the detachable structure further comprises two buckling components for a slide fixation of the gimbal vibration damper.

Preferably, two sliders, for respectively matching with the sliding tracks, are configured to be located at a lower surface of the fuselage of the UAV; a cross section of one of the two sliders is "⌐"-shaped, and a cross section of the other slider is "└"-shaped.

Preferably, the vibration damping component is a bowl-type rubber vibration damping component.

In the second aspect of the present invention, a shock absorption system is provided, which comprises the gimbal vibration damper for the UAV (unmanned aerial vehicle) mentioned above, a gimbal located below the gimbal vibration damper, and a camera located on the gimbal.

Preferably, the gimbal is fixedly connected with a lower surface of a lower vibration damping sheet of the gimbal vibration damper.

Preferably, the camera is an infrared camera.

Preferably, the camera is a dual-camera which comprises an infrared camera and a visible camera.

Preferably, a shaft is located on the gimbal, the cameras are able to rotate 360° around the shaft.

Main advantages of the present invention are as follows.

(1) The gimbal vibration damper for the UAV (unmanned aerial vehicle) is capable of providing a better damping effect for the gimbal.

(2) The gimbal vibration damper for the UAV is convenient to be manufactured and low in cost.

(3) The gimbal vibration damper for the UAV is nice in appearance.

It should be understood that, within the scope of the present invention, each technical feature of the present invention described above and technical features described in the following (as embodiments) may be combined with each other to form a new or preferred technical solution. Due to space limitations, no description is further explained again here.

BRIEF DESCRIPTION OF THE DRAWINGS

To describe the technical solutions in the embodiments of the present invention or in the prior art more clearly, the accompanying drawings required for describing the embodiments or the prior art are briefly introduced as follows. Apparently, the accompanying drawings in the following description are merely some of the embodiments of the present invention, and those skilled in the art may obtain other drawings according to these drawings without creative efforts.

Figure 1:
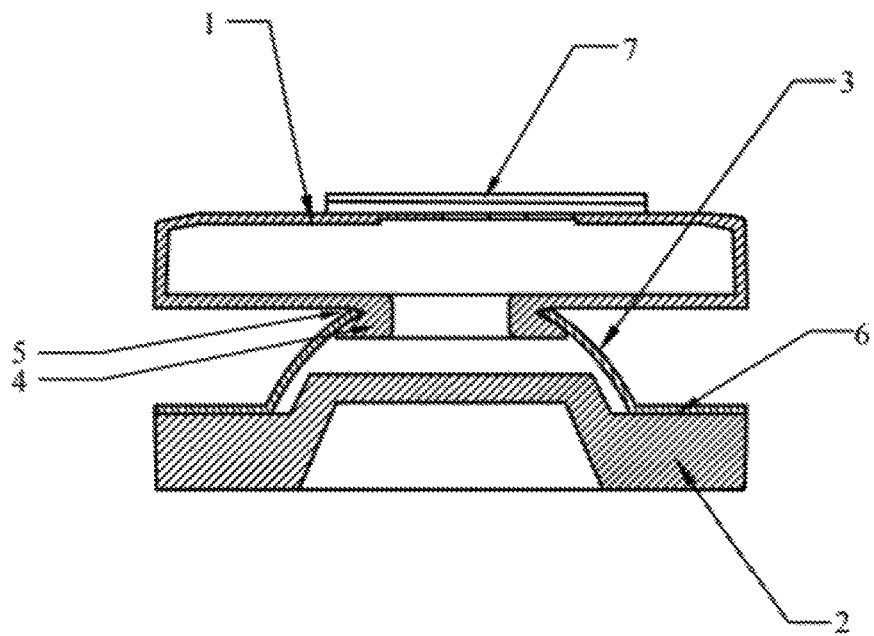
FIG. 1 is a cross-sectional view of a gimbal vibration damper according to a first embodiment of the present invention.

In the drawings, 20: shock absorption system; 1: upper vibration damping sheet; 2: lower vibration damping sheet; 3: bowl-type rubber vibration damping component; 4: connecting member; 5: groove; 6: fitting connector; 7: detachable structure; 8: buckling component; 9: gimbal; 10: camera; 11 gimbal vibration damper; 12: shaft; 71: sliding track; 101: infrared camera; 102: visible camera.

DETAILED DESCRIPTION OF THE PREFERRED EMBODIMENT

After extensive and intensive research, the present inventor has developed a gimbal vibration damper for a UAV (unmanned aerial vehicle) through a large number of screening for the first time. The gimbal vibration damper has a specific structure. Compared with the existing vibration damper for the UAV, the damping component used in the gimbal vibration damper of the present invention is able to provide a better damping effect for the gimbal, and is convenient to be manufactured, low in cost and beautiful in appearance. Based on the above description, the present invention has been completed.

Gimbal Vibration Damper for a UAV

The present invention provides a gimbal vibration damper for a UAV which has a special structure.

Typically, the gimbal vibration damper for the UAV provided by the present invention comprises an upper vibration damping sheet, a lower vibration damping sheet and a vibration damping component, wherein: the upper vibration damping sheet is configured to be connected with a fuselage of the UAV, the lower vibration damping sheet is configured to be connected with a gimbal, the first vibration damping sheet does not contact with the second vibration damping sheet, the upper vibration damping sheet is connected with the lower vibration damping sheet through the vibration damping component. In the whole device, the vibration damping component plays the role of shock absorption, that is, an air column is formed between the upper vibration damping sheet and the lower vibration damping inside the vibration damping component, to play the role of gimbal damping.

Shock Absorption System

Typically, a shock absorption system provided by the present invention comprises the gimbal vibration damper mentioned above, a gimbal and a camera, wherein the gimbal is fixedly connected with a lower end of the shock absorption system, the camera is located on the gimbal. Through the damping effect of the gimbal vibration damper, the images captured by the camera are significantly reduced in jitter amplitude, so that the images are clearer and more stable, and the imaging effects are better.

The present invention is further described below with reference to specific embodiments. It should be understood that these examples are only for illustrating the present invention and are not intended to limit the scope of the present invention. In addition, the drawings are schematic diagrams, and thus the apparatus and system of the present invention are not limited by the size or the ratio of the schematic diagrams.

It should be noted that in the specification and claims of the present invention, the located-related terms, such as the "upper end", "lower end", "upper surface", "lower surface", "upper portion" and "lower portion", are corresponding to the UAV installed to the gimbal vibration damper provided by the present invention, and the flight status direction visual angle of the UAV, which is only for more convenient to describe the relative position of each component, and does not necessarily mean that there is such an actual positional relationship among the various components. For example, the relationship terms such as "first" and "second" are only for distinguishing one entity or operation from another entity or operation without necessarily requiring or implying that any such actual relationship or sequence exists between these entities or operations. Moreover, terms "comprise" and "include" or other any variants are intended to cover non-exclusive inclusions, so that processes, methods, apparatus or articles which include a series of elements not only include these elements, but also include other elements which are not explicitly listed, or include the inherent elements of the processes, methods, apparatuses or articles. In the absence of more restrictions, elements defined by the phrase "include a" do not exclude the existence of additional identical elements in the processes, methods, article, or apparatus that include the elements.

First Embodiment

Figure 2:
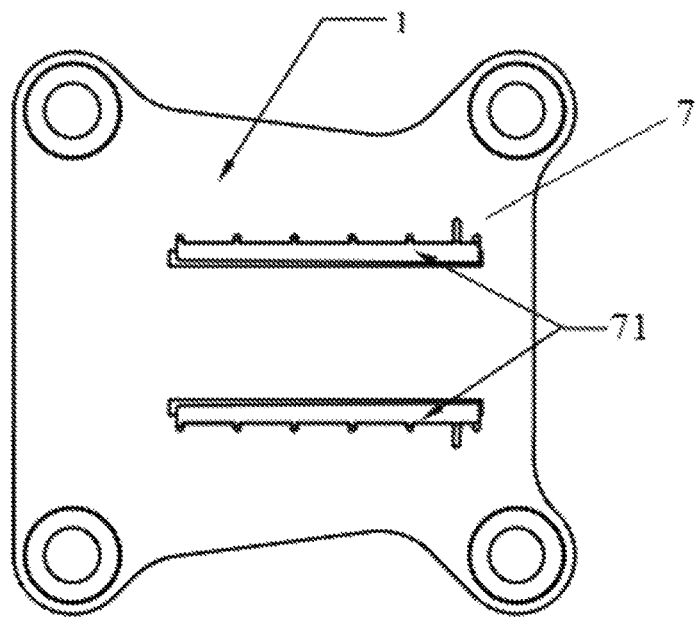
FIG. 2 is a top view of the gimbal vibration damper according to the first embodiment of the present invention.

Referring to FIGS. 1 and 2, a gimbal vibration damper for a UAV (unmanned aerial vehicle) is illustrated, which comprises an upper vibration damping sheet 1, a lower vibration damping sheet 2 and a bowl-type rubber vibration damping component 3, three of which are coaxially arranged. The upper vibration damping sheet 1 is connected with a lower surface of a fuselage of the UAV. The lower vibration damping sheet 2 is connected with a gimbal. The bowl-type rubber vibration damping component 3 is located between the upper vibration damping sheet 1 and the lower vibration damping sheet 2. The upper vibration damping sheet 1 does not contact with the lower vibration damping sheet 2, that is, an air column is formed between the upper vibration damping sheet 1 and the lower vibration damping sheet 2 inside the bowl-type rubber vibration damping component 3 for playing the role of shock absorption. An upper end of the bowl-type rubber vibration damping component 3 is fixed with the upper vibration damping sheet 1, a lower end of the bowl-type rubber vibration damping component 3 is fixed with the lower vibration damping sheet 2, an upper cross-sectional area of the bowl-type rubber vibration damping component 3 is smaller than a lower cross-sectional area of the bowl-type rubber vibration damping component 3, so that the gimbal is more stable.

A connecting member 4, which is connected with the bowl-type rubber vibration damping component 3, is located at a lower surface of the upper vibration damping sheet 1 and is integrated with the upper vibration damping sheet 1 into one whole. The connecting member 4 is a protruding component, a cross section of the connecting member 4 is round, a joint of the connecting member 4 and the upper vibration damping sheet 1 has a round groove 5, the upper end of the bowl-type rubber vibration damping component 3 is inserted into the groove 5 for fixing. A fitting connector 6 is located at the lower end of the bowl-type rubber vibration damping component 3 and is fixedly connected with an upper surface of the lower vibration damping sheet 2, a contact area between the fitting connector 6 and the lower vibration damping sheet 2 is ½ of an upper surface area of the lower vibration damping sheet 2.

A detachable structure 7 is located on an upper surface of the upper vibration damping sheet 1 for detachably connected with the fuselage of the UAV. The detachable structure 7 comprises two sliding tracks, a cross section of each of the sliding tracks is "]"-shaped or "["-shaped. Accordingly, two sliders, for respectively matching with the sliding tracks, are located at a lower surface of the fuselage of the UAV; a cross section of one of the two sliders is "⌐"-shaped, and a cross section of the other slider is "∟"-shaped.

Second Embodiment

Figure 3:
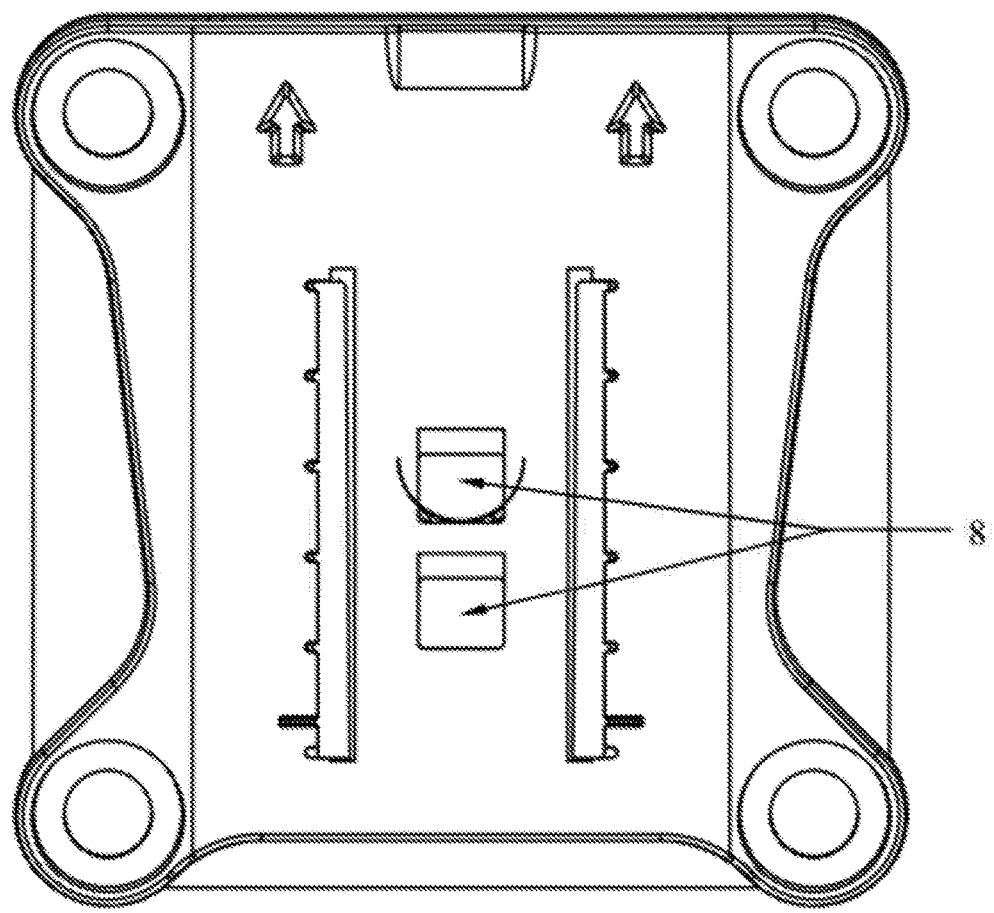
FIG. 3 is a top view of a gimbal vibration damper according to a second embodiment of the present invention.

As shown in FIG. 3, a main structure of a gimbal vibration damper for a UAV (unmanned aerial vehicle) according to a second preferred embodiment of the present invention is basically same as that of the gimbal vibration damper for the UAV according to the first embodiment of the present invention. There are some differences between the second preferred embodiment and the first preferred embodiment of the present invention as follows. The detachable structure 7 of the gimbal vibration damper according to the second embodiment further comprises two buckling components 8 for fixing the fuselage with the gimbal vibration damper after the sliders of the fuselage slide for a certain distance along the sliding tracks of the gimbal vibration damper.

Third Embodiment

Figure 4:
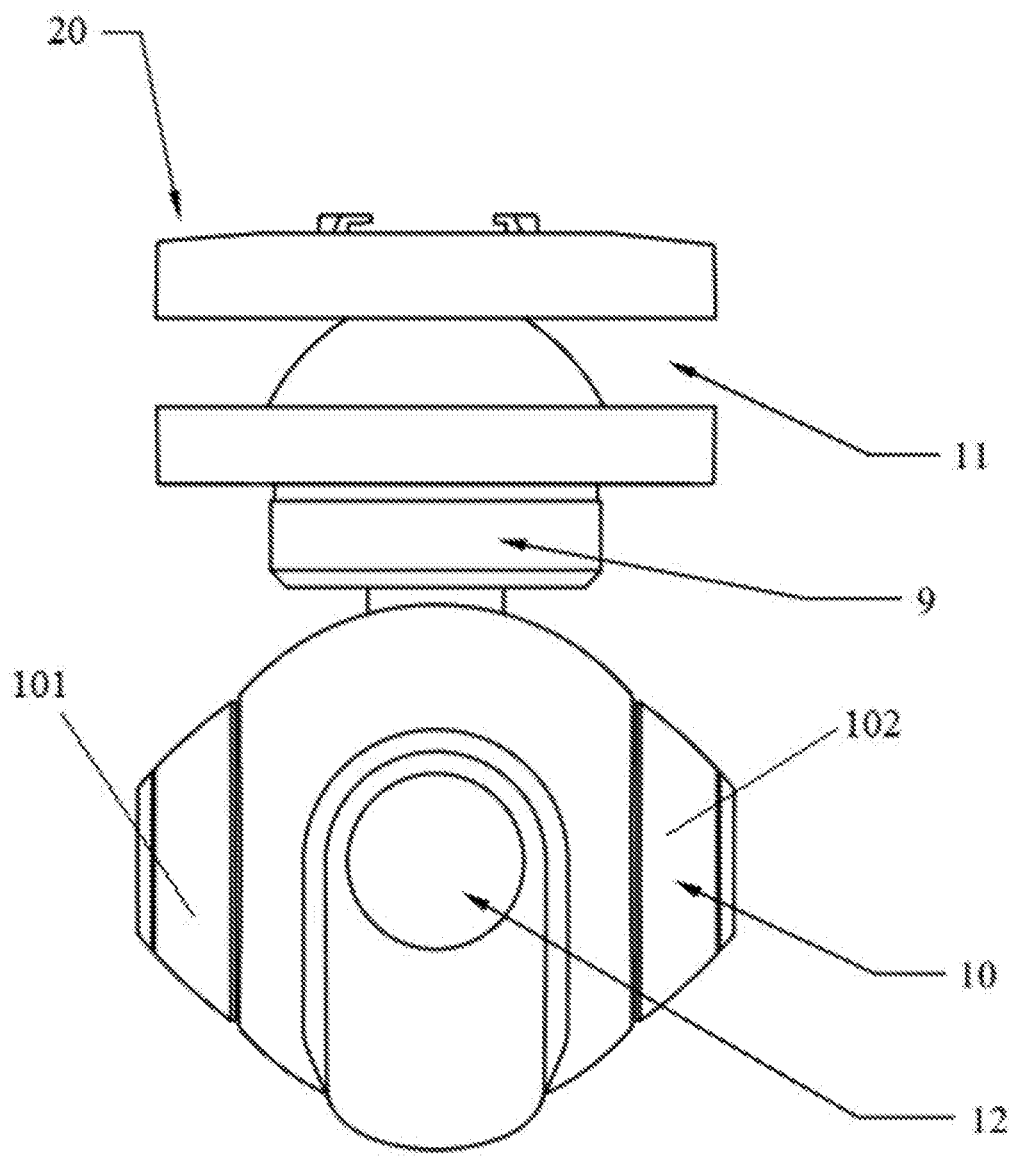
FIG. 4 is a main view of a shock absorption system according to a third embodiment of the present invention.

Referring to FIG. 4, a shock absorption system according to a third embodiment of the present invention is illustrated, which comprises the gimbal vibration damper 11 mentioned in the first embodiment of the present invention, a gimbal 9 located below the gimbal vibration damper 11, and cameras 10 located on the gimbal 9, wherein the gimbal 10 is fixedly connected with a lower surface of a lower vibration damping sheet of the gimbal vibration damper 11, a shaft 12 is located on the gimbal 9, the cameras 10 are able to rotate 360° around the shaft 12. An amount of the cameras 10 is two, and the cameras 10 are infrared cameras. Or the camera is a dual-camera which comprises an infrared camera 101 and a visible camera 102.

All references mentioned in the present invention are incorporated herein by reference, as each reference was individually incorporated by reference. In addition, it should be understood that after reading the above teachings of the present invention, those skilled in the art can make various modifications or changes to the present invention, and these equivalent forms also fall within the scope of the appended claims of the present invention.

What is claimed is:

1. A gimbal vibration damper for a UAV (unmanned aerial vehicle), comprising: an upper vibration damping sheet which is configured to be connected with a bottom surface of a fuselage of the UAV, a lower vibration damping sheet which is configured to be connected with a top of a gimbal, and a vibration damping component which is located between the upper vibration damping sheet and the lower vibration damping sheet, wherein:
an upper end of the vibration damping component is fixed with the upper vibration damping sheet, a lower end of the vibration damping component is fixed with the lower vibration damping sheet;
an upper cross-sectional area of the vibration damping component is smaller than a lower cross-sectional area thereof.

2. The gimbal vibration damper for the UAV, as recited in claim 1, wherein all of the upper vibration damping sheet, the lower vibration damping sheet and the vibration damping component are coaxially arranged.

3. The gimbal vibration damper for the UAV, as recited in claim 1, wherein a connecting member, which is connected with the vibration damping component, is located at a lower surface of the upper vibration damping sheet.

4. The gimbal vibration damper for the UAV, as recited in claim 3, wherein the connecting member is a protruding component, a cross section of the connecting member is round, a joint of the connecting member and the upper vibration damping sheet has a round groove.

5. The gimbal vibration damper for the UAV, as recited in claim 4, wherein the protruding component is integrated with the upper vibration damping sheet into one whole.

6. The gimbal vibration damper for the UAV, as recited in claim 4, wherein the upper end of the vibration damping component is inserted into the groove.

7. The gimbal vibration damper for the UAV, as recited in claim 1, wherein a fitting connector is located at the lower end of the vibration damping component and is fixedly connected with an upper surface of the lower vibration damping sheet.

8. The gimbal vibration damper for the UAV, as recited in claim 7, wherein a contact area between the fitting connector and the lower vibration damping sheet is ½ of an upper surface area of the lower vibration damping sheet.

9. The gimbal vibration damper for the UAV, as recited in claim 1, wherein an air column is provided between the upper vibration damping sheet and the lower vibration damping sheet inside the vibration damping component.

10. The gimbal vibration damper for the UAV, as recited in claim 1, wherein a detachable structure is located on an upper surface of the upper vibration damping sheet for detachably connected with the fuselage of the UAV.

11. The gimbal vibration damper for the UAV, as recited in claim 10, wherein the detachable structure comprises two sliding tracks, two cross sections of the sliding tracks are respectively "]"-shaped and "["-shaped.

12. The gimbal vibration damper for the UAV, as recited in claim 11, wherein two sliders, for respectively matching with the sliding tracks, are configured to be located at a lower surface of the fuselage of the UAV; a cross section of one of the two sliders is "⌐"-shaped, and a cross section of the other slider is "∟"-shaped.

13. The gimbal vibration damper for the UAV, as recited in claim 12, wherein the vibration damping component is a bowl-type rubber vibration damping component.

14. The gimbal vibration damper for the UAV, as recited in claim 10, wherein the detachable structure further comprises two buckling components for a slide fixation of the gimbal vibration damper.

15. A shock absorption system, comprising a gimbal vibration damper for a UAV (unmanned aerial vehicle), a gimbal located below the gimbal vibration damper, and a camera located on the gimbal, wherein:
the gimbal vibration damper comprises an upper vibration damping sheet which is configured to be connected with a bottom surface of a fuselage of the UAV, a lower vibration damping sheet which is configured to be connected with a top of the gimbal, and a vibration damping component which is located between the upper vibration damping sheet and the lower vibration damping sheet, wherein an upper end of the vibration damping component is fixed with the upper vibration damping sheet, a lower end of the vibration damping component is fixed with the lower vibration damping sheet;

an upper cross-sectional area of the vibration damping component is smaller than a lower cross-sectional area thereof.

16. The shock absorption system, as recited in claim 15, wherein the gimbal is fixedly connected with a lower surface of a lower vibration damping sheet of the gimbal vibration damper.

17. The shock absorption system, as recited in claim 15, wherein the camera is an infrared camera.

18. The shock absorption system, as recited in claim 15, wherein the camera is a dual-camera which comprises an infrared camera and an visible camera.

19. The shock absorption system, as recited in claim 15, wherein a shaft is located on the gimbal, the cameras are able to rotate 360° around the shaft.

* * * * *